Patented July 28, 1936

2,048,779

UNITED STATES PATENT OFFICE 2,048,779

MOLDING COMPOSITION AND METHOD OF MAKING THE SAME

Amerigo F. Caprio, Newark, N. J., assignor to Celluloid Corporation, a corporation of New Jersey No Drawing. Application April 13, 1932, Serial No. 605,121

3 Claims. (Cl. 106—49)

This invention relates to the preparation of molding compositions comprising organic derivative of cellulose and a plasticizer therefor.

An object of my invention is to prepare molding powders comprising an intimate mixture of an organic derivative of cellulose and a plasticizer in an economical manner. Other objects of my invention will appear from the following detailed description.

Molding compositions containing organic derivative of cellulose and plasticizer are in extensive use because of their many desirable properties. Such molding compositions should have the organic derivative of cellulose and plasticizer in very intimate admixture in order to produce molded articles of required strength. Many expedients have been resorted to in order to obtain such intimate admixture but all of these involve rather expensive manipulative steps and/or the use of volatile solvents, which generally cannot be completely removed from the product and whose cost adds to the expense of the process.

I have found a method of producing molding compositions comprising an organic derivative of cellulose and plasticizer in intimate admixture, which method is quite simple and inexpensive. I have found that if cellulose acetate or other organic derivative of cellulose is agitated with the plasticizer in the presence of water or other liquid that has no solvent action on either the organic derivative of cellulose or the plasticizer, the organic derivative of cellulose selectively absorbs or adsorbs the plasticizer to form a composition that may be molded under heat and pressure to produce any desired articles.

In accordance with my invention I prepare a composition adapted to be molded and containing an organic derivative of cellulose and plasticizer by agitating the organic derivative of cellulose and plasticizer in the presence of a liquid that has no solvent action on the same and then removing the liquid from the product thus formed.

The organic derivative of cellulose employed in this invention may be an organic ester of cellulose or an organic ether of cellulose. Examples of organic esters of cellulose are cellulose acetate, cellulose formate, cellulose propionate and cellulose butyrate while examples of cellulose ethers are methyl cellulose, ethyl cellulose and benzyl cellulose. However I prefer to employ cellulose acetate as the organic derivative of cellulose and this invention will be described more specifically in connection therewith. While the acetone soluble cellulose acetate will generally be employed because of its commercial availability, an advantage of my invention is that a cellulose acetate of any solubility characteristics is adapted to be used therein.

The cellulose acetate or organic derivative of cellulose used as the starting material may be in the form of fibres, grains, granules, powder or any other desired form.

Any suitable plasticizer may be employed, but generally one that is not soluble in water is preferred. Examples of cellulose acetate plasticizers are dimethyl phthalate, diethyl phthalate, dibutyl tartrate, mono-methyl xylene sulfonamide, triphenyl phosphate, tricresyl phosphate or mixtures of two or more of these. The amount of plasticizer employed will depend on the characteristics of the molded product desired and generally will be from 30 to 100% of the weight of the cellulose acetate.

The plasticizer may be added to the cellulose acetate and water in any suitable form. The plasticizer may be in the form of an emulsion or colloidal solution in water or aqueous liquid, when added with stirring to the cellulose acetate and water. Alternatively if the plasticizer is a liquid it may be added as such, or if it is a solid it is preferably added while in a molten condition.

I prefer to employ water as the vehicle or bath in which the cellulose acetate and plasticizer are stirred for reasons of economy. However the use of other volatile liquids that have no solvent action on the organic derivative of cellulose and/or plasticizer is not excluded. Preferably the amount of water present is relatively large say from 5 to 20 times the weight of the cellulose acetate present. The temperature of the water may be room temperatures or below, but for expediting the action, I prefer to employ elevated temperatures say from 40 to 100° C. In selecting the temperature of treatment due regard should be had to the volatility of the plasticizer, and when plasticizers of relatively high volatility are employed, the temperature of treatment should preferably be reduced.

As to the time of agitation or treatment of the cellulose acetate with the plasticizer this will vary with the temperature of treatment, the nature of the materials employed and results desired, but will generally be on the order of from 1 to 10 hours. This agitation may be carried out in any suitable devices, such as mechanical mixers, ball mills, colloid mills, or in any other apparatus for causing intimate admixture.

Pigments, dyes, lakes, filling materials, stabilizers and any other effect materials may be added to the cellulose acetate either before, during or after the agitation thereof with the plasticizer in the presence of water.

After the cellulose acetate has selectively absorbed the plasticizer to the desired extent, the intimate mixture of cellulose acetate and plasticizer is removed from the water by any suitable means, such as settling, filtration, centrifuging or evaporation. Preferably the molding composition is separated from the water by mechanical means and the remaining water is removed by evaporation under atmospheric pressure or if desired under reduced pressure.

As stated the cellulose acetate employed as the starting material may be in any desired form or size. Often it is desirable to agitate the cellulose acetate with water for a period of time to reduce the size thereof before the addition of the plasticizer, but this is not absolutely necessary since the agitation or stirring and the absorption of the plasticizer often causes the size of the cellulose acetate to be reduced to that of a powder.

I prefer to stir or agitate the cellulose acetate, plasticizer and water as vigorously as possible and employ any suitable mechanical means for this purpose.

It will be seen that by my process the use of a violatile organic liquid that is a solvent for the organic derivative of cellulose and/or the plasticizer is avoided. This is highly desirable not only from a point of view of the economy entailed by the saving in cost of these solvents, but also from the point of view of superiority of product produced since when such volatile solvents are employed, it is impossible to remove the last traces thereof and they are present in the final molded product and are apt to cause warping or distortion of the molded articles when they finally volatilize off after a period of time.

The molding composition made in accordance with this invention has the cellulose acetate and plasticizer in intimate admixture, the plasticizer being uniformly distributed throughout. This product is free of organic solvents for either the cellulose acetate or plasticizer and therefore is capable of forming molded articles that will not tend to warp. The molding composition made by this invention may be molded under heat and pressure in any suitable manner to form any desired articles such as toilet articles, parts of electric apparatus and indeed for making any articles and for all purposes for which composition made by previous methods may be used.

The molding composition may be molded in ordinary molds under heat and pressure or it may be molded by heating the same until it is plastic and then forcing the material under pressure into a mold or die.

In order further to illustrate my invention, but without being limited thereto the following examples are given.

*Example I*

50 lbs. of granular cellulose acetate of the acetone soluble variety are suspended in 1000 lbs. of water with vigorous agitation in a steam jacketed tank. The temperature is brought up to and maintained at 60° C. After one hour stirring, 25 lbs. of dimethyl phthalate and 5 lbs. of molten triphenyl phosphate are added, and the agitation continued for five hours. The solid product is then separated by filtration and dried. The resulting powder, when molded under heat and pressure, gives a clear transparent material.

*Example II*

100 lbs. of granular cellulose acetate of the acetone insoluble variety are mixed for one hour with 2000 lbs. of water with vigorous stirring. The temperature is brought to 60° C. and there are added 20 lbs. of paraethyltoluene-sulfonamide, 10 lbs. of dimethyl phthalate, 10 lbs. of molten triphenyl phosphate, and 6 lbs. of Alizarine Lake. The vigorous agitation is continued for 8 hours at 60° C. The solids are then separated by filtration and dried. The resulting powder when molded under heat and pressure gives a red transparent material.

It is to be understood that the foregoing detailed description is given merely by way of illustration and that many variations may be made therein without departing from the spirit of my invention.

Having described my invention what I claim and desire to secure by Letters Patent is:

1. Method of forming a composition containing an organic derivative of cellulose and a plasticizer in intimate admixture, comprising agitating a finely divided organic derivative of cellulose and a water-insoluble plasticizer in the presence of aqueous liquid in an amount equal to 20 times the weight of the organic derivative of cellulose present and containing no substantial amount of solvent either for the organic derivative of cellulose or for the plasticizer whereby the organic derivative of cellulose absorbs the plasticizer, and then separating the aqueous liquid therefrom by filtration.

2. Method of forming a composition containing cellulose acetate and a plasticizer in intimate admixture, comprising agitating finely divided cellulose acetate and a water-insoluble plasticizer in the presence of aqueous liquid in an amount equal to 20 times the weight of the cellulose acetate present and containing no substantial amount of solvent either for the cellulose acetate or for the plasticizer whereby the cellulose acetate absorbs the plasticizer, and then separating the aqueous liquid therefrom by filtration.

3. Method of forming a composition containing cellulose acetate and a plasticizer in intimate admixture, comprising agitating finely divided cellulose acetate, dimethyl phthalate and triphenyl phosphate in the presence of aqueous liquid in an amount equal to 20 times the weight of the cellulose acetate present and containing no substantial amount of solvent either for the cellulose acetate or for the dimethyl phthalate or triphenyl phosphate whereby the cellulose acetate absorbs the dimethyl phthalate and triphenyl phosphate, and then separating the aqueous liquid therefrom by filtration.

AMERIGO F. CAPRIO.